United States Patent

[11] 3,618,533

| [72] | Inventor | Archie J. Hirst<br>Leicester, England |
|---|---|---|
| [21] | Appl. No. | 866,456 |
| [22] | Filed | Oct. 15, 1969 |
| [45] | Patented | Nov. 9, 1971 |
| [73] | Assignee | The Dunlop Company Limited<br>London, England |
| [32] | Priority | Oct. 19, 1968 |
| [33] | | Great Britain |
| [31] | | 49,697/68 |

[54] ELASTOMERIC RAILWAY VEHICLE SPRING SUSPENSION
8 Claims, 4 Drawing Figs.

[52] U.S. Cl. .................................................. 105/195,
105/196, 105/197 A, 105/209, 105/224.1
[51] Int. Cl. ...................................................... B61f 3/10,
B61f 5/08, B61f 5/10
[50] Field of Search............................................ 105/182,
195, 196, 197, 197 A, 197.2, 218, 224, 224.1, 209

[56] References Cited
UNITED STATES PATENTS

| 1,445,023 | 2/1923 | Lamont...................... | 105/195 |
| 1,485,224 | 2/1924 | Hamilton..................... | 105/218 |
| 2,048,280 | 7/1936 | Mohl........................... | 105/196 X |
| 2,197,727 | 4/1940 | Ledwinka.................... | 105/182 |
| 2,211,462 | 8/1940 | Hobson........................ | 105/197.2 |
| 2,286,563 | 6/1942 | Mussey........................ | 105/224.1 |
| 3,342,140 | 9/1967 | Lich............................. | 105/196 X |

FOREIGN PATENTS

| 944,056 | 7/1962 | Great Britain................ | 105/209 |

*Primary Examiner*—Arthur L. La Point
*Assistant Examiner*—Howard Beltran
*Attorney*—Harness, Dickey & Pierce ABSTRACT: A railway vehicle having three pairs of wheels of which the axles are supported by axle boxes, and a suspension for the wheels comprising, for the axle box of each wheel of the center pair of wheels, a pair of oppositely extending equalizing beams, each beam being connected to the central axle box by means of a resilient pad located between two abutment faces associated respectively with the beam and the central axle box, the beams extending in the longitudinal direction of the vehicle and the ends of the beams remote from the central axle box being connected respectively to the adjacent one of the axle boxes of the two other wheels on the same side of the vehicle, and rubber springs supporting the vertical load of the suspended part of the vehicle from the equalizing beams and acting to transmit the longitudinal traction and braking forces between the wheels and the suspended part of the vehicle, the rubber springs being positioned so as to distribute the vertical load of the suspended part of the vehicle in a required proportion between the wheels.

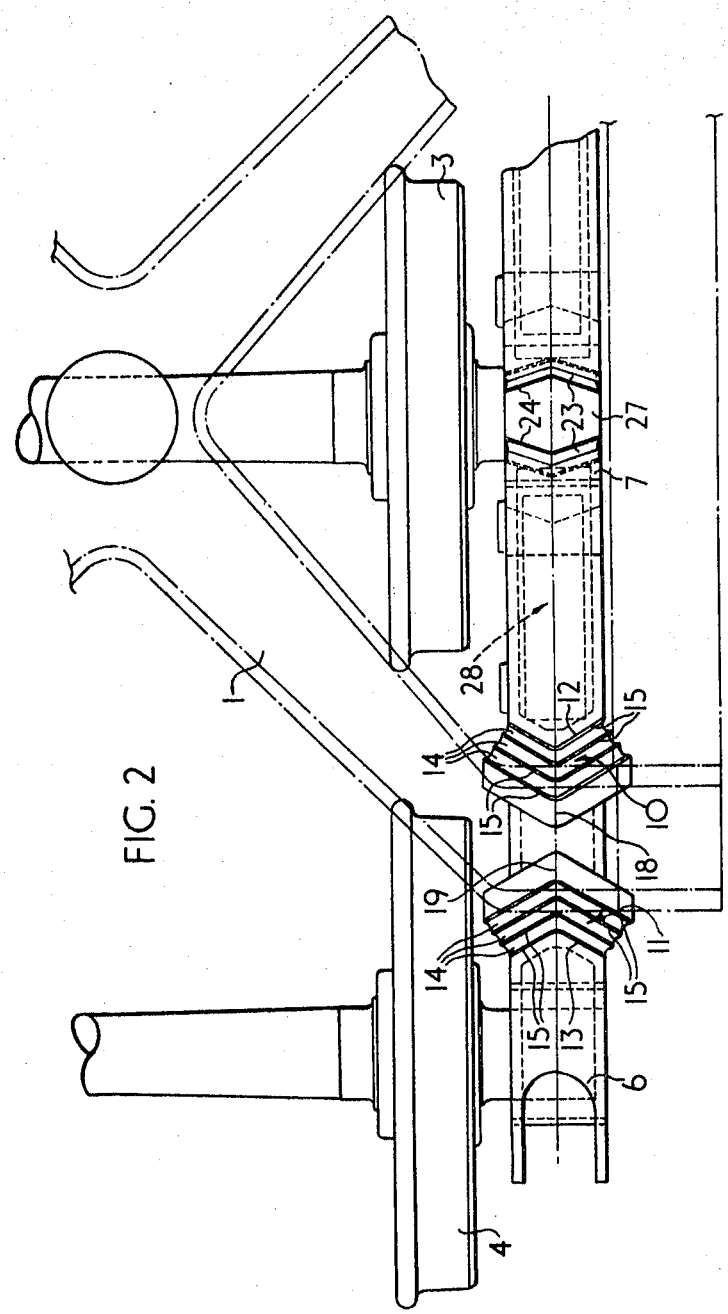

ELASTOMERIC RAILWAY VEHICLE SPRING SUSPENSION

This invention relates to railway vehicle suspension systems and is an improvement in or modification of the invention described in the specification of our U.K. Pat. No. 944,056.

The specification of our U.K. Pat. NO. 944,056 relates to a railway vehicle having three pairs of wheels of which the axles are supported by axle boxes and a suspension for the wheels comprising, for the axle box of each wheel of the center pair of wheels, a pair of oppositely extending equalizing beams pivoted by pivots to the housing of the axle box or a part connected to the housing thereof so as to be able to swing up and down in a vertical longitudinal plane, the beams extending in the longitudinal direction of the vehicle and the ends of the beams remote from the axle box being connected respectively to the adjacent one of the axle box housings of the two other wheels on the same side of the vehicle and rubber springs supporting the vertical load of the suspended part of the vehicle from the equalizing beams and acting to transmit the longitudinal traction and braking forces between the wheels and the suspended part of the vehicle, the rubber springs being positioned so as to distribute the vertical load of the suspended part of the vehicle in a required proportion between the wheels.

With this arrangement each equalizer beam is connected at one end portion to one outer axle box and at its other end portion it is pivotally connected to one side of the adjacent central axle box. The beam applies a vertical load to each axle box at the point of attachment thereto.

The load distribution between the two axle boxes is therefore dependent upon the positioning of the rubber springs along the horizontal separation of the two end portions of the beam.

Since a limitation is placed on the proximity of the rubber springs to the outer axle box which may be achieved without affecting the thickness, and thus reducing the rigidity, of the beam or reducing the size of the springs, the horizontal separation of the end portions of the beam and hence the separation of the adjacent axle boxes cannot be reduced below a certain minimum while maintaining a desired load distribution.

According to the present invention there is provided a railway vehicle having three pairs of wheels of which the axles are supported by axle boxes, and a suspension for the wheels comprising, for the axle box of each wheel of the center pair of wheels, a pair of oppositely extending equalizing beams, each beam being connected to the central axle box by means of a resilient pad located between two abutment faces associated respectively with the beam and the central axle box, the beams extending in the longitudinal direction of the vehicle and the ends of the beams remote from the central axle box being connected respectively to the adjacent one of the axle boxes of the two other wheels on the same side of the vehicle, and rubber springs supporting the vertical load of the suspended part of the vehicle from the equalizing beams and acting to transmit the longitudinal traction and braking forces between the wheels and the suspended part of the vehicle, the rubber springs being positioned so as to distribute the vertical load of the suspended part of the vehicle in a required proportion between the wheels.

Preferably the abutment faces are arranged so that when a vertical load is applied to the beams through the rubber springs loads are applied by the beams to the central axle boxes acting substantially radially with respect to the axis of the associated wheels.

Preferably also, each equalizer beam is provided with a link member connected to the equalizer beam and to the central axle box to reduce rocking or tilting of the axle box in a plane perpendicular to the wheel axes.

One embodiment of the invention will now be described by way of example with reference to the accompanying drawings, in which:

FIG. 2 is a plan view of the suspension shown in FIG. 1, and

Figure 1:
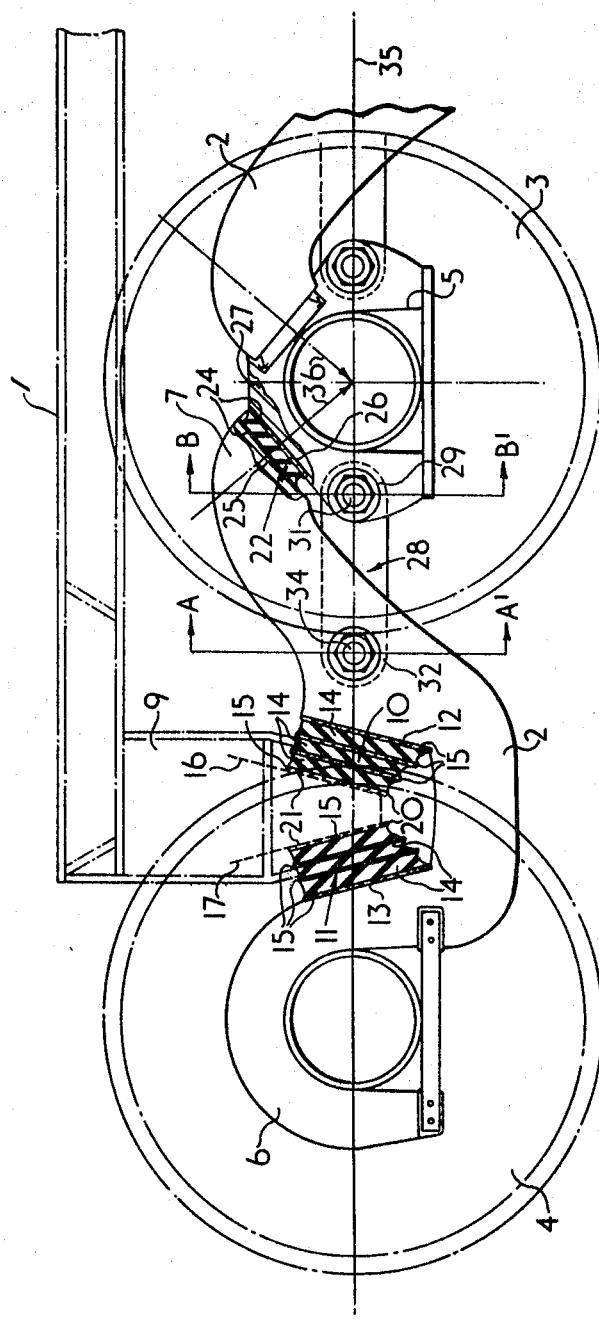
FIG. 1 is a side view of part of a railway vehicle suspension in accordance with the present invention partly cut away to show an equalizer beam spring and resilient mounting pad in section.
Figure 4:
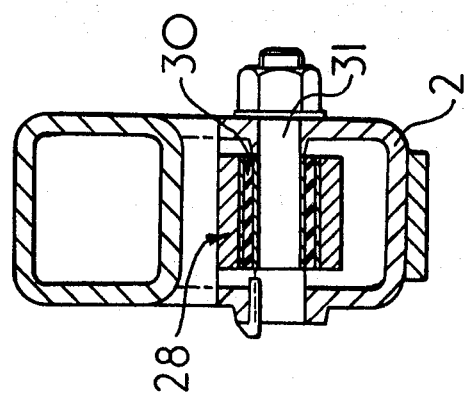
FIG. 4 is an enlarged cross-sectional view taken along the line B—B of FIG. 1 and shows the connection with the link member 28 with the axle box 5.
Figure 3:
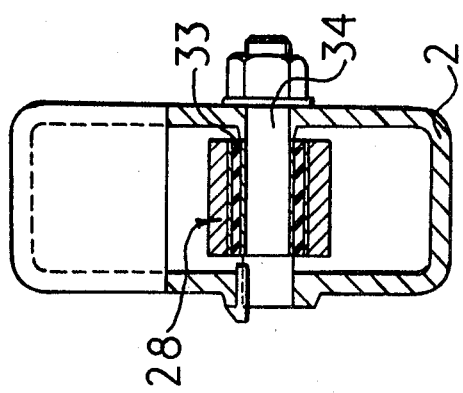
FIG. 3 is an enlarged cross-sectional view taken along the line A—A of FIG. 1 and shows the connection with the link member 28 with the equalizing beam 2.

A railway vehicle bogie, part of which is shown in FIGS. 1 and 2, comprises a substantially cruciform supporting structure or bolster 1 supported by means of four rigid equalizing beams 2 on three pairs of wheels two of which, 3 and 4, are shown.

Each wheel 3 of the central pair of wheels has an axle box 5 associated therewith. Each equalizing beam 2 is of box construction and extends in the longitudinal direction of the bogie between two adjacent wheels e.g. 3 and 4 on one side of the bogie. The beams have a first end portion 6 of inverted U-shape which provides an axle box for the adjacent outer wheel 4 and a second end portion 7 which is mounted on the axle box 5 of the adjacent central wheel 3.

Each beam has a cutout portion 8 and is secured to a post 9 extending downwards from a leg of the cruciform structure 1 by means of two rubber spring assemblies 10,11 secured between the post 9 and the V-shaped sidewalls 12,13 defining the cutout portion 8. Each rubber spring assembly 10,11 comprises a stack of V-shaped rubber blocks 14 interleaved between and bonded to V-shaped metal plates 15. The two assemblies 10,11 are arranged one on each side of the post 9 in the longitudinal direction with respect to the vehicle bogie, and each assembly is secured to V-shaped abutments (not shown) formed on the post 9 and to the sidewalls 12,13 of the cutout. The assemblies are each arranged to be V-shaped when seen in plan view with the apex 18,19 pointing towards the post, the line 16,17 of each apex extending upwardly and outwardly relative to the post from the lower region 20 to the upper region 21 of the spring assembly. With this arrangement a load is supported by compression and shear of the springs.

The second end portion 7 of each beam is mounted on the associated central axle box 5 by means of a resilient pad 22 comprising a V-shaped rubber block 23 interposed between and bonded to V-shaped metal plates 24. The metal plates are secured respectively to V-shaped abutments 25,26 formed on the end portion 7 of the beam and the upper portion 27 of the central axle box 5. The abutments are inclined and arranged tangentially so that when a vertical load is applied to the beam through the rubber spring assemblies a load is applied to the central axle box acting radially with respect to the axis of the associated wheel 3.

To reduce rocking or tilting of the central axle boxes in a plane perpendicular to the axes of the wheels 3,4 link members 28 are provided, connecting each central axle box to the two beams associated therewith. Each link member 28 is pivotally connected at one end 29 to one side of a central axle box 5 by means of a rubber bushed, see detail 30, pivot pin 31, and is connected at its other end 32 to the beam 2 associated with the said side of the central axle box 5 by means of rubber bushed, see detail 33, pivot pin 34. The link member is arranged on the central axle box in fore-and-aft alignment with the horizontal plane containing the axes of the associated wheels (shown in FIG. 1 by the line 35).

The axle box load distribution is dependent upon the longitudinal positioning of the rubber springs on the equalizer beams. By arranging the reaction thrust transmitted by each equalizer beam 2 to the central axle box 5 to act radially with respect to the axis of the associated wheel 3 and at right angles to the beam 2, along the line 36, the greatest turning moment about the post 9, for a given length of beam, can be obtained. This tangential arrangement of the resilient pads enables the shortest beam length to be used which in turn results in a reduction of the longitudinal separation of adjacent axle boxes while maintaining a desired axle box load distribution.

In addition, the tangential arrangement of the resilient pads reduces the tendency for the central axle box to tilt in the case where braking reaction is transmitted to the equalizer beam.

In the embodiment described above a vehicle suspension system is described in relation to a railway vehicle bogie but a vehicle suspension system according to the invention may also be used in any other suitable railway vehicle, for example a six-wheeled shunting locomotive.

Having now described my invention—what I claim is:

1. A railway vehicle suspension system for the wheels at one side of a railway vehicle or the like having three pairs of longitudinally spaced wheels, said suspension system comprising an axle box associated with each wheel of said wheels, a pair of abutment surfaces formed on the central wheel axle box, a pair of equalizer beams, each of said equalizer beams having a respective abutment surface at one end thereof associated with a respective one of the central wheel axle box abutment surfaces, a pair of resilient pads each interposed between a respective pair of said equalizer beam and said central wheel axle box abutment surfaces, said abutment surfaces and said resilient pads being oriented to transmit loads between said central wheel axle box and said equalizer beams in a direction passing substantially through the axis of said central wheel for minimizing twisting forces on said central wheel axle box, means for affixing the other ends of each of said equalizer beams to a respective one of the axle boxes of the front and rear wheels, and rubber springs interposed between each of said equalizer beams and the suspended portion of the vehicle for transmitting vertical and longitudinal loads between said wheels and said suspended vehicle portion.

2. A railway vehicle suspension system according to claim 1 wherein each of the resilient pads comprises at least one V-shaped rubber block interposed between and bonded to V-shaped metal plates, the metal plates being secured respectively to V-shaped abutment surfaces formed on the end portion of each beam and the respective abutment surface of the central axle box.

3. A railway vehicle suspension system according to claim 1 wherein each rubber spring comprises two spring assemblies, each spring assembly comprising at least one V-shaped rubber block interleaved between and bonded to V-shaped metal plates.

4. A railway vehicle suspension system to claim 1 wherein each rubber spring assembly is secured between a post extending from the suspended part of the vehicle and a pair of sidewalls defining a cutout portion of the associated beam, the spring assemblies being arranged one on each side of the post in the longitudinal direction, and V-shaped abutments, to accommodate the spring assemblies, being formed on the post and in the sidewalls of the said cutout portion.

5. A railway vehicle suspension system according to claim 4 wherein each post extends downwards and the spring assemblies of each spring are arranged so that when viewed in plan the apex of each assembly points towards its respective post and the line of each apex extends upwardly and outwardly relative to the post from the lower region to the upper region of the spring assembly.

6. A railway vehicle suspension system according to claim 1 wherein each equalizer beam is provided with a link member connected to the equalizer beam and to the central axle box to reduce rocking or tilting of the central axle box in a plane perpendicular to the wheel axes.

7. A railway vehicle suspension system according to claim 6 wherein the link member is aligned fore-and-aft with the horizontal plane containing the axes of the associated wheels.

8. A railway vehicle suspension system according to claim 1 wherein the end of each equalizer beam adjacent the outer axle has an inverted U-shaped configuration which acts as an axle box, for the associated outer axle.

* * * * *